(12) United States Patent
Cheng et al.

(10) Patent No.: US 10,230,926 B2
(45) Date of Patent: Mar. 12, 2019

(54) WIRELESS VIDEO SIGNAL TRANSMITTER, RECEIVER, TRANSMISSION SYSTEM AND DISPLAY SYSTEM

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Peng Cheng, Beijing (CN); Shuhuan Yu, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/785,298

(22) PCT Filed: Jul. 14, 2015

(86) PCT No.: PCT/CN2015/083962
§ 371 (c)(1),
(2) Date: Oct. 16, 2015

(87) PCT Pub. No.: WO2016/150031
PCT Pub. Date: Sep. 29, 2016

(65) Prior Publication Data
US 2017/0118448 A1 Apr. 27, 2017

(30) Foreign Application Priority Data
Mar. 20, 2015 (CN) .......................... 2015 1 0125048

(51) Int. Cl.
*H04N 5/38* (2006.01)
*H04N 7/20* (2006.01)
(Continued)

(52) U.S. Cl.
CPC ............... *H04N 7/20* (2013.01); *G09G 5/00* (2013.01); *G09G 5/006* (2013.01); *H04N 5/38* (2013.01);
(Continued)

(58) Field of Classification Search
CPC .. H04N 5/44; H04N 5/38; H04N 7/20; H04N 7/015; H04N 21/226; H04N 7/0127; H04N 21/23439; H04N 21/42607
See application file for complete search history.

(56) References Cited

U.S. PATENT DOCUMENTS 6,072,998 A * 6/2000 Kaku ................... H03G 3/3052
375/345
6,978,117 B2 * 12/2005 Zerod .................. H03G 3/3068
455/226.3
(Continued)

FOREIGN PATENT DOCUMENTS

CN 1455593 11/2003
CN 102664684 9/2012
(Continued)

OTHER PUBLICATIONS

International Search Report and Written Opinion with English Language Translation, dated Aug. 26, 2015, Application No. PCT/CN2015/083962.
(Continued)

*Primary Examiner* — Jefferey F Harold
*Assistant Examiner* — Human M Satti
(74) *Attorney, Agent, or Firm* — Womble Bond Dickinson (US) LLP

(57) ABSTRACT

The present invention provides a wireless video signal transmitter, a receiver, a transmission system and a display system, which relates to the technical field of WiGig wireless transmission. According to an embodiment of the pres-
(Continued)

ent invention, the wireless video signal transmitter comprises a frequency multiplication unit and a wireless transmitting unit. The frequency multiplication unit is operable to implement the frequency multiplication of a video signal, so as to obtain a first signal and transmit the first signal to the wireless transmitting unit. The wireless transmitting unit is operable to process the first signal to obtain a second signal suitable for wireless transmission, and to transmit the signal wirelessly. The display system of the present invention may receive and process the ultra high-definition video signal processed and transmitted by the wireless video signal transmission system.

18 Claims, 1 Drawing Sheet

(51) Int. Cl.
| | | |
|---|---|---|
| *H04N 7/01* | (2006.01) | |
| *H04N 7/015* | (2006.01) | |
| *H04N 21/226* | (2011.01) | |
| *H04N 21/2343* | (2011.01) | |
| *H04N 21/426* | (2011.01) | |
| *G09G 5/00* | (2006.01) | |
| *H04N 21/41* | (2011.01) | |
| *H04N 21/4363* | (2011.01) | |
| *H04N 5/44* | (2011.01) | |

(52) U.S. Cl.
CPC ........... *H04N 7/015* (2013.01); *H04N 7/0127* (2013.01); *H04N 21/226* (2013.01); *H04N 21/23439* (2013.01); *H04N 21/4122* (2013.01); *H04N 21/42607* (2013.01); *H04N 21/43637* (2013.01); *G09G 2350/00* (2013.01); *G09G 2370/16* (2013.01); *H04N 5/44* (2013.01)

(56) References Cited

U.S. PATENT DOCUMENTS

| | | |
|---|---|---|
| 2005/0289631 A1 | 12/2005 | Shoemake |
| 2006/0087594 A1 | 4/2006 | Adachi et al. |
| 2008/0051049 A1 | 2/2008 | Katoh et al. |
| 2009/0243915 A1 | 10/2009 | Nishizato et al. |
| 2012/0105729 A1* | 5/2012 | Stopler .................... H04N 5/38 348/723 |
| 2015/0074232 A1 | 3/2015 | Phillips et al. |
| 2015/0229934 A1* | 8/2015 | Li ........................ H04N 19/29 375/240.16 |
| 2016/0021326 A1 | 1/2016 | Ma et al. |
| 2016/0100129 A1* | 4/2016 | Im ........................ H04N 7/0127 348/441 |
| 2016/0119060 A1* | 4/2016 | Byers ................... H04B 10/502 398/130 |
| 2016/0218673 A1* | 7/2016 | Anderson ................ H03D 7/14 |
| 2016/0275919 A1* | 9/2016 | Lawrence ................ G09G 5/39 |

FOREIGN PATENT DOCUMENTS

| | | |
|---|---|---|
| CN | 202841363 U | 3/2013 |
| CN | 103152541 | 6/2013 |
| CN | 203351179 U | 12/2013 |
| CN | 103533336 | 1/2014 |
| CN | 103533336 A | 1/2014 |
| CN | 103702060 A | 4/2014 |
| CN | 104065944 | 9/2014 |
| CN | 104378650 | 2/2015 |
| CN | 104683713 | 6/2015 |
| KR | 20130041500 | 4/2013 |
| KR | 20130041500 A | 4/2013 |

OTHER PUBLICATIONS

Office Action in Chinese Application No. 201510125048.X dated Apr. 17, 2017, with English translation.
Office Action in Chinese Application No. 201510125048.X dated Sep. 27, 2017, with English translation.
"Third Office Action," CN Application No. 201510125048.X (dated Feb. 8, 2018).
Supplementary European Search Report and Written Opinion received for EP Patent Application No. 15834708.8, dated Aug. 10, 2018, 10 pages.
International Preliminary Report on Patentability received for PCT Patent Application No. PCT/CN2015/083962, dated Oct. 5, 2017, 14 pages (9 pages of English Translation and 5 pages of Original Document).
Anonymous, "Wireless Gigabit Alliance—Wikipedia", Feb. 10, 2015, 8 pages, Available at https://en.wikipedia.org/w/index.php?title=Wireless GigabitAlliance&oldid=646533018.

* cited by examiner

WIRELESS VIDEO SIGNAL TRANSMITTER, RECEIVER, TRANSMISSION SYSTEM AND DISPLAY SYSTEM

TECHNICAL FIELD

The present invention relates to the technical field of WiGig wireless transmission, more particularly relates to a wireless video signal transmitter, a wireless video signal receiver, a wireless video signal transmission system and a display system.

BACKGROUND

With the development of display technologies, ultra high-definition display devices have become more and more popular. However, the transmission system of the ultra high-definition display device may have relatively high complexity as well as multifarious wires, and when a system board for processing ultra high-definition signal is built into a display device, the thickness of the display device will be increased, thus not meeting the aesthetics requirement. To solve this problem, the thickness of the display device may be decreased by the way of externally locating the system board. However, traditional wireless transmission and display systems can only transmit and display Full High Definition (FHD) video data and other video signals with lower resolution formats. Therefore, in the prior art, multifarious wires must be used to transmit ultra high-definition signals. With the development of display technologies, ultra high-definition display devices have become more and more popular and traditional transmission systems are far from being capable of meeting the requirement of ultra high-definition display.

SUMMARY

In view of the above problem in the existing display device, one technical problem to be solved by the present invention is to provide a wireless video signal transmitter, a wireless video signal receiver, a wireless video signal transmission system and a display system for implementing video signal transmission, each of which has a simple construction.

According to one aspect of the present invention, a technical solution adopted for solving a technical problem addressed in the present invention is a wireless video signal transmitter comprising: a frequency multiplication unit and a wireless transmitting unit;

the frequency multiplication unit is operable to implement the frequency multiplication of a video signal, so as to obtain a first signal and transmit the first signal to the wireless transmitting unit; and the wireless transmitting unit is operable to process the first signal to obtain a second signal suitable for wireless transmission, and to transmit the signal wirelessly.

Optionally, the wireless video signal transmitter further comprises a receiving interface operable to receive a video signal, wherein the ultra high-definition video signal is derived from the video signal.

Optionally, the wireless video signal transmitter further comprises an up-converting module.

The up-converting module is operable to receive the video signal from the receiving interface, and to convert the video signal into an ultra high-definition video signal if the video signal is not an ultra high-definition video signal.

Optionally, the refresh rate of the first signal, after being frequency multiplied by the frequency multiplication unit, is 120 Hz.

Optionally, the wireless transmitting unit comprises a first attenuator, a first local oscillator, a first intermediate frequency amplifier, an emitter and a transmitting antenna;

the first attenuator is operable to adjust the power of the first signal to obtain a first intermediate signal, and to transmit the first intermediate signal to the first local oscillator;

the first local oscillator is operable to produce an oscillation frequency signal, and to mix the oscillation frequency signal with the first intermediate signal in order to obtain a second intermediate signal;

the first intermediate frequency amplifier is operable to amplify the power of the second intermediate signal to obtain a third intermediate signal, and to output the third intermediate signal to the emitter; and the emitter is operable to up-convert the received third intermediate signal to a second signal, and to emit the second signal through the transmitting antenna.

Optionally, the frequency of the second signal is 60 GHz.

Optionally, the wireless transmitting unit may transmit the second signal using the WiGig technology.

According to a second aspect of the present invention, a technical solution adopted for solving a technical problem addressed in the present invention is a wireless video signal receiver comprising a receiving unit, and the receiving unit is operable to receive the second signal transmitted from any of the above described wireless video signal transmitters.

Optionally, the receiving unit comprises a receiving antenna, a second attenuator, a receiver, a second local oscillator, and a second intermediate frequency amplifier;

the receiving antenna is operable to receive the second signal transmitted from a wireless transmitting unit;

the second attenuator is operable to decrease the power of the second signal received by the receiving antenna to obtain a forth intermediate signal;

the receiver is operable to demodulate the forth intermediate signal to obtain a fifth intermediate signal;

the second local oscillator is operable to modulate the frequency of the fifth intermediate signal, so as to obtain a sixth intermediate signal; and the second intermediate frequency amplifier is operable to amplify the sixth intermediate signal modulated by the second local oscillator, so as to obtain the first signal.

According to a third aspect of the present invention, a technical solution adopted for solving a technical problem addressed in the present invention is a wireless video signal transmission system, which comprises any one of the above described wireless video signal receivers and any one of the above described wireless video signal transmitters.

According to a fourth aspect of the present invention, a technical solution adopted for solving a technical problem addressed in the present invention is a display system comprising any one of the above described wireless video signal receivers.

Optionally, the display system further comprises a display unit, which is operable to display as a video the signal which is received and processed by the wireless video signal receiver.

Optionally, the display system is any of a cell phone, a laptop, a tablet and a television.

The wireless video signal transmitter, the wireless video signal receiver, the wireless transmission system and the display system according to some aspects of the present invention have at least the following beneficial effects:

The thickness of the display device may be decreased by the way of externally locating the system board in combination with the wireless transmission, which meets the aesthetics requirement. Meanwhile, due to the use of the wireless transmission, multifarious wires and interfaces are not required for transmitting ultra high-definition signals. The problems in the prior art, such as the high complexity of ultra high-definition video transmission device, the multifariousness of wires and the like, may be solved.

According to another embodiment of the present invention, a wireless video transmission system may parse an ultra high-definition video signal or a normal video signal; subsequently, the system may transmit and process the signals respectively; and a corresponding display system may receive the processed ultra high-definition video signal from the wireless video transmission system. As such, no matter whether an ultra high-definition video signal or a normal video signal is received, ultra high-definition display of pictures may be implemented, therefore ensuring the forward compatibility of the wireless video transmission system.

BRIEF DESCRIPTION OF THE DRAWINGS

To explain the technical solutions in the embodiments of the present invention more clearly, accompanying drawings required for describing the embodiments are briefly described below. It is apparent for the ordinary skilled in the art that the accompanying drawings merely show some embodiments of the present invention, and the ordinary skilled in the art may derive other drawings from such accompanying drawings without any creative effort.

DETAILED DESCRIPTION

For the ordinary skilled in the art to better understand the purposes, technical solutions and advantages of the present invention, the present invention will be further described in detail in conjunction with accompanying drawings and specific embodiments hereinafter.

According to an embodiment of the present invention, a wireless video signal transmitter comprises a frequency multiplication unit and a wireless transmitting unit. The frequency multiplication unit is operable to implement the frequency multiplication of a video signal, so as to obtain a first signal and transmit the first signal to the wireless transmitting unit. The wireless transmitting unit is operable to process the first signal to obtain a second signal suitable for wireless transmission, and to transmit the second signal wirelessly.

Among others, the wireless video signal transmitter in the embodiment may be applicable for the transmission of an ultra high-definition signal. The term ultra high-definition is the official name of the information display with "4K resolution (3840×2160 pixels)" newly approved by the International Telecommunications Union, which is defined as "ultra HD (Ultra High-Definition)".

According to an embodiment of the present invention, a wireless video signal receiver is operable to receive the signal transmitted from the above described wireless video signal transmitter.

According to an embodiment of the present invention, a wireless video signal transmission system comprises the above described wireless video signal transmitter and the above described wireless video signal receiver.

According to an embodiment of the present invention, a display system has the above described wireless video signal receiver.

It is noted that in some embodiments of the present invention, the wireless video signal transmission system may be implemented based on the WiGig ultra-high speed wireless technology. The WiGig ultra-high speed wireless technology is a WiGig (Wireless gigabit) technology, which is 10 time faster than WiFi (Wireless Fidelity) technology, and a high-definition video may be transmitted from a device, such as computer and set-top box, to a display system, such as television, without the need for network cable.

According to several embodiments of the present invention, the wireless video signal transmission system may transmit an ultra high-definition video signal to a display device, so as to display the ultra high-definition video. Hereinafter, some specific implementation of the present invention will be described in detail with reference to the accompanying drawings.

Figure 1:
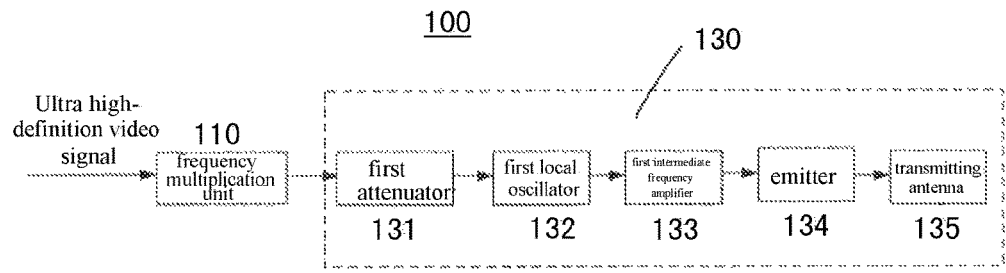
FIG. 1 is a schematic diagram of a wireless video signal transmitter according to an embodiment of the present invention.

As shown in FIG. 1, an embodiment of the present invention provides a wireless video signal transmitter 100. The wireless video signal transmitter 100 comprises a frequency multiplication unit 110 and a wireless transmission unit 130 (as shown in dashed box of FIG. 1). In a particular embodiment, the frequency multiplication unit 110 may be implemented as a frame rate converter (FRC). The frequency multiplication unit 110 may be used for doubling the refresh rate of an ultra high-definition video signal. The wireless transmission unit 130 may comprise a first attenuator 131, a first local oscillator 132, a first intermediate frequency amplifier 133, an emitter 134 and a transmitting antenna 135.

Hereinafter, an ultra high-definition video signal (VHD) with the resolution of 3840*2160 pixels and the refresh rate of 30 Hz will be explained by way of an example. Firstly, an ultra high-definition video signal (VHD) with the resolution of 3840*2160 pixels and the refresh rate of 30 Hz may be transmitted to the frequency multiplication unit 110 through a fixed interface, such as a HDMI interface, a DP interface and a USB interface, or a wireless network interface, such as a WiFi network interface. Optionally, the frequency multiplication unit 110 may multiply the refresh rate of the ultra high-definition video signal to 120 Hz, so as to obtain a first signal. It is noted that 120 Hz is just an example, and the refresh rate of the ultra high-definition video signal may be multiplied to another refresh rate. At this point, the first signal is a high frequency signal, and the first signal will be transmitted to the first attenuator 131. The first attenuator 131 adjusts the power of the first signal, so that the adjusted first signal, i.e. a first intermediate signal, may be transmitted to the first local oscillator 132. The first local oscillator 132 produces an oscillation frequency signal, and the oscillation frequency signal is mixed with the first intermediate signal to obtain an intermediate frequency signal, i.e. a second intermediate signal. Then, the power of the second intermediate signal may be amplified by the intermediate frequency amplifier 133 to obtain a third intermediate signal, and the third intermediate signal is transmitted to the emitter 134. The emitter 134 up-converts the third signal to a second signal with the frequency of 60 Hz through a mixer therein, and the second signal is emitted through the transmitting antenna 135. It is noted that 60 GHz is just an example, and the frequency of the third signal may be up-converted to other transmitting frequency. Now the wireless video signal transmitter 100 has completed the transmission of an ultra high-definition signal.

It is noted that the reason why the frequency multiplication unit 110 in the above described video signal transmitter 100 optionally multiplies the refresh rate of the ultra high-definition video signal to 120 Hz is to increase the resolution as high as possible while guarantee the visual ability of human eyes and protecting the visual acuity, therefore the refresh rate is multiplied to 120 Hz. The refresh rate may also be adjusted based on the actual needs.

Further, it is noted that in the above example, the frequency of the third intermediate signal is up-converted to 60 GHz, the reason for which is to enable the transmitting antenna to provide a better transmission for signals, and other frequencies may be used for transmission based on the actual needs.

Figure 2:
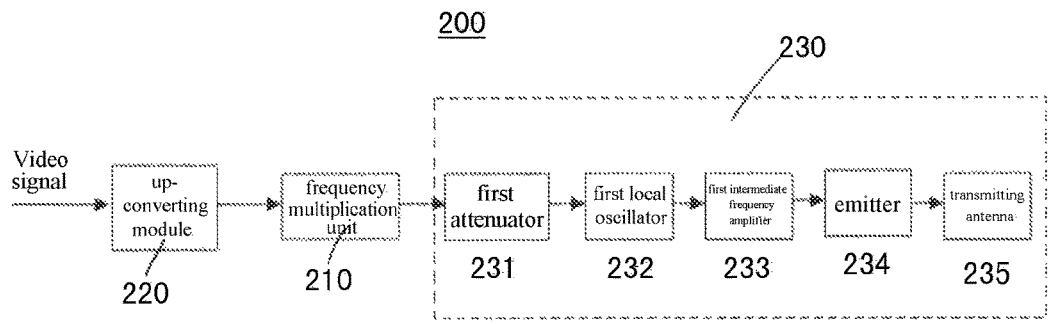
FIG. 2 is a schematic diagram of another wireless video signal transmitter according to another embodiment of the present invention.

As shown in FIG. 2, according to another embodiment of the present invention, another wireless video signal transmitter 200 is provided. The difference between the wireless video signal transmitter 200 and the wireless video signal transmitter 100 shown in FIG. 1 lies in that an up-converting module 220 is added in the wireless video signal transmitter 200. As described with reference to FIG. 1, an ultra high-definition video signal may be received through a fixed interface, such as a HDMI interface, a DP interface and a USB interface, or a wireless network interface, such as a WiFi network interface. A non-ultra high-definition video signal may also be received through a same receiving interface (not shown). The up-converting module 220 is operable to receive video signals from the receiving interface. If a non-ultra high-definition video signal, such as a full high definition (FHD) video signal or other video signals, is received, the resolution of the received video signal is increased to the resolution of the ultra high-definition video signal, i.e. the video signal will be converted into an ultra high-definition video signal, and subsequently, the ultra high-definition video signal may be transmitted to the frequency multiplication unit 210. Other portions of the wireless video signal transmitter 200 are identical to the embodiment as shown in FIG. 1, and the detailed description thereof will be omitted herein. It is noted that the video signal to be up-converted by the up-converting module 220 of the wireless video signal transmitter 200 is a normal video signal with lower resolution, such as a video signal with the resolution of 1920*1080 pixels and the refresh rate of 30 Hz.

The frequency multiplication unit 110 and the wireless transmission unit 130 of the wireless video signal transmitter 100 shown in FIG. 1 may be accommodated within a box. Similarly, the up-converting module 220, the frequency multiplication unit 210 and the wireless transmission unit 230 of the wireless video signal transmitter 200 shown in FIG. 2 may also be accommodated within a box. The integration within one box may facilitate the space saving and the convenience of maintenance. In addition, the same one wireless video signal transmitter 100, 200 may be shared by a plurality of displays, and the wireless video signal transmitter 100, 200 may transmit an ultra high-definition video signal to the plurality of displays wirelessly. The technology may be compatible with WiFi, and may be shared for interaction by cell phones and laptops.

Figure 3:
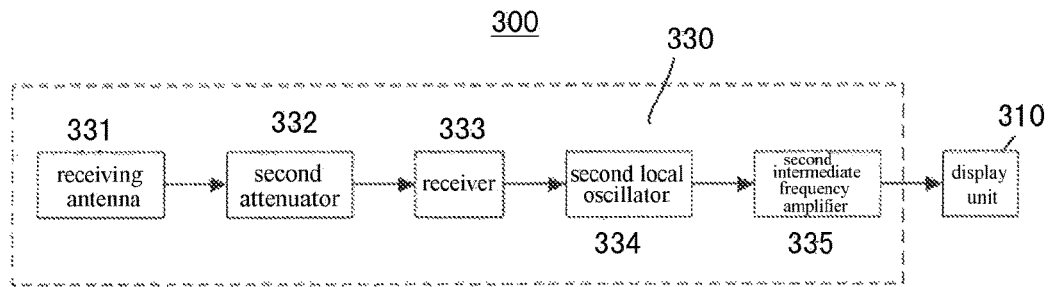
FIG. 3 is a schematic diagram of a wireless video signal receiver according to another embodiment of the present invention.

As shown in FIG. 3, a wireless video signal receiver is provided according to another embodiment of the present invention. The wireless video signal receiver has a receiving unit 330 located therein. The receiving unit 330 may be capable of receiving the ultra high-definition video signals (the second signals) emitted from the above described wireless video signal transmitter 100, 200.

In one specific implementation, the receiving unit 330 comprises a receiving antenna 331, a second attenuator 332, a receiver 333, a second local oscillator 334, and a second intermediate frequency amplifier 335.

After the wireless video signal transmitter 100, 200 transmits a signal, the receiving unit 330 in the wireless video signal receiver begins to operate. At the beginning, the receiving antenna 331 receives the second signal, and transmits the second signal to the second attenuator 332. Since the second signal is in the high frequency band, the second attenuator 332 decreases the power of the second signal to obtain a fourth intermediate signal. The second attenuator 332 transmits the fourth intermediate signal to the receiver 333, so as to demodulate the fourth intermediate signal to obtain a fifth intermediate signal. The receiver 333 transmits the fifth intermediate signal to the second local oscillator 334, so that the fifth intermediate signal is mixed with its oscillation frequency signal, and at this point, the signal is recovered to an intermediate frequency signal, i.e. a sixth intermediate signal. The sixth intermediate signal is passed through the second intermediate frequency amplifier 335, so that the power thereof may be increased and the first signal is obtained. Finally, the first signal is transmitted to the display unit 310 of a display system, so as to display the high-definition video.

According to another embodiment of the present invention, a display system 300 is provided, which comprises an above described wireless video signal receiver 330 and a display unit 310, wherein the signal processed by the above described wireless video signal receiver 330 is displayed by the display unit 310, so as to display the high-definition video.

The display system described above may be any of an ultra high-definition cell phone, a laptop, a tablet, a television and other display devices.

According to another embodiment of the present invention, a wireless video signal transmission system is provided, which comprises the wireless video signal transmitter 100, 200 and a wireless video signal receiver as described above.

According to one embodiment of the present invention, the wireless video signal transmission system is based on the WiGig technology. The wireless video signal transmission system parses an ultra high-definition video signal or a normal video signal, subsequently transmits and processes the signals respectively, and a corresponding ultra high-definition display system receives and displays the ultra high-definition video signal processed by the wireless video transmission system, so that ultra high-definition display of pictures may be achieved, and the problems in the prior art, such as the high complexity of ultra high-definition video transmission device, the multifariousness of wires and the like, may be solved.

The present invention has been described in connection with some specific embodiments of the present invention. It may be understood that the above described implementations are simply the exemplary implementation adopted for illustrating the principle of the present invention, and the present invention is not limited thereto. For the ordinary skilled in the art, various variations and modifications may be made without departing from the spirit and essence of the present invention, and all such variations and modifications are intended to be included within the scope of the present invention.

The words "first", "second", "third" etc. have been used in the description. Unless the additional context explicitly indicates otherwise, the use of such words is not intended to imply any ordering, but actually intended for identification. For example, phrases "a first version" and "a second version" do not imply that the first version is the original version or established before the second version, or the first version is requested or operated before the second version. In fact, such phrases are intended for identifying different versions.

The foregoing description is simply the specific implementation of the present invention, and the scope of the present invention is not limited thereto. All the alteration, equivalent replacements and modifications, etc. within the spirit and principle of the invention should be included in the scope of the present invention. Therefore, the scope of the present invention should be defined by appended claims.

In the claim, any reference sign between parentheses should not be construed as limiting the claim. The term "comprise" does not exclude the presence of elements or steps other than the elements or steps listed in claim. The word "a" or "an" preceding an element does not exclude the presence of a plurality of such elements.

In a device or system claim enumerating several means, one or more of these means may be embodied by one and the same item of hardware.

The mere fact that certain measures are recited in mutually different dependent claims does not indicate that a combination of these measures can not be used to advantage.

The invention claimed is:

1. A wireless video signal transmitter comprising: a frequency multiplier and a wireless transmitter;
    the frequency multiplier is operable to implement the frequency multiplication of an ultra high-definition video signal, so as to obtain a first signal and transmit the first signal to the wireless transmitter, wherein the frequency multiplication is configured to multiply the refresh rate of the ultra high-definition video signal to another refresh rate; and
    the wireless transmitter is operable to process the first signal to obtain a second signal suitable for wireless transmission, and to transmit the second signal wirelessly to a separate display for rendering the ultra high-definition video signal, wherein the wireless transmitter comprises a first attenuator operable to adjust the power of the first signal before processing the first signal to obtain the second signal,
    wherein the wireless video signal transmitter further comprises an up-converter, the up-converter is operable to receive a video signal, and to convert a resolution of the video signal into a resolution of an ultra high-definition video signal when the video signal is not an ultra high-definition video signal, and the frequency multiplier, the wireless transmitter and the up-converter are accommodated within a box.

2. The wireless video signal transmitter according to claim 1, further comprising a receiving interface circuit, the receiving interface circuit is operable to receive the video signal.

3. The wireless video signal transmitter according to claim 1, wherein the refresh rate of the first signal, after being frequency multiplied by the frequency multiplier, is 120 Hz.

4. The wireless video signal transmitter according to claim 1, wherein the wireless transmitter further comprises a first local oscillator, a first intermediate frequency amplifier, an emitter and a transmitting antenna;
    the first attenuator is operable to adjust the power of the first signal to obtain a first intermediate signal, and to transmit the first intermediate signal to the first local oscillator;
    the first local oscillator is operable to produce an oscillation frequency signal, and to mix the oscillation frequency signal with the first intermediate signal to obtain a second intermediate signal;
    the first intermediate frequency amplifier is operable to amplify the power of the second intermediate signal to obtain a third intermediate signal, and to output the third intermediate signal to the emitter; and
    the emitter is operable to up-convert the received third intermediate signal to a second signal, and to emit the second signal through the transmitting antenna.

5. The wireless video signal transmitter according to claim 3, wherein the transmitting frequency of the second signal is 60 GHz.

6. The wireless video signal transmitter according to claim 1, wherein the wireless transmitter transmits the second signal using the WiGig technology.

7. A wireless video signal receiver comprising a receiver, wherein the receiver is operable to receive a second signal transmitted by a wireless video signal transmitter comprising a frequency multiplier and a wireless transmitter, which is separate from the wireless video signal receiver,
    wherein the frequency multiplier is operable to implement the frequency multiplication of an ultra high-definition video signal, so as to obtain a first signal and transmit the first signal to the wireless transmitter, wherein the frequency multiplication is configured to multiply the refresh rate of the ultra high-definition video signal to another refresh rate; and
    wherein the wireless transmitter is operable to process the first signal to obtain the second signal suitable for wireless transmission, and to transmit the second signal wirelessly to the receiver, wherein the wireless transmitter comprises a first attenuator operable to adjust the power of the first signal before processing the first signal to obtain the second signal,
    wherein the wireless video signal transmitter further comprises an up-converter, the up-converter is operable to receive a video signal, and to convert a resolution of the video signal into a resolution of an ultra high-definition video signal when the video signal is not an ultra high-definition video signal, and the frequency multiplier, the wireless transmitter and the up-converter are accommodated within a box.

8. The wireless video signal receiver according to claim 7, wherein the receiver comprises a receiving antenna, a second attenuator, a receiver, a second local oscillator, and a second intermediate frequency amplifier;
    the receiving antenna is operable to receive the second signal transmitted by the wireless transmitter;
    the second attenuator is operable to decrease the power of the second signal received by the receiving antenna to obtain a fourth intermediate signal;

the receiver is operable to demodulate the fourth intermediate signal to obtain a fifth intermediate signal;

the second local oscillator is operable to modulate the frequency of the fifth intermediate signal, so as to obtain a sixth intermediate signal; and the second intermediate frequency amplifier is operable to amplify the sixth intermediate signal modulated by the second local oscillator, so as to obtain the first signal.

9. A wireless video signal transmission system, wherein the wireless video signal transmission system comprises a wireless video signal transmitter and a wireless video signal receiver which is separate from the wireless video signal transmitter, and wherein the wireless video signal transmitter comprising: a frequency multiplier and a wireless transmitter, the frequency multiplier is operable to implement the frequency multiplication of an ultra high-definition video signal, so as to obtain a first signal and transmit the first signal to the wireless transmitter, wherein the frequency multiplication is configured to multiply the refresh rate of the ultra high-definition video signal to another refresh rate; and the wireless transmitter is operable to process the first signal to obtain a second signal suitable for wireless transmission, and to transmit the second signal wirelessly to the separate wireless video signal receiver, wherein the wireless transmitter comprises a first attenuator operable to adjust the power of the first signal before processing the first signal to obtain the second signal, wherein the wireless video signal transmitter further comprises an up-converter, the up-converter is operable to receive a video signal, and to convert a resolution of the video signal into a resolution of an ultra high-definition video signal when the video signal is not an ultra high-definition video signal, and the frequency multiplier, the wireless transmitter and the up-converter are accommodated within a box;

wherein the wireless video signal receiver comprises a receiver that is operable to receive the second signal transmitted by a wireless video signal transmitter.

10. A display system, wherein the display system comprises the wireless video signal receiver according to claim 7.

11. The display system according to claim 10, wherein the display system further comprises a display unit, which is operable to display as video the signal received and processed by the wireless video signal receiver.

12. The display system according to claim 11, wherein the display system is any of a cell phone, a laptop, a tablet and a television.

13. The wireless video signal receiver according to claim 7, wherein the refresh rate of the first signal, after being frequency multiplied by the frequency multiplier, is 120 Hz.

14. The wireless video signal receiver according to claim 9, wherein the transmitting frequency of the second signal is 60 GHz.

15. The wireless video signal transmission system according to claim 9, wherein the wireless video signal transmitter further comprises a receiving interface circuit, the receiving interface circuit is operable to receive the video signal.

16. The wireless video signal transmission system according to claim 9, wherein the wireless transmitter further comprises a first local oscillator, a first intermediate frequency amplifier, an emitter and a transmitting antenna;

the first attenuator is operable to adjust the power of the first signal to obtain a first intermediate signal, and to transmit the first intermediate signal to the first local oscillator;

the first local oscillator is operable to produce an oscillation frequency signal, and to mix the oscillation frequency signal with the first intermediate signal to obtain a second intermediate signal;

the first intermediate frequency amplifier is operable to amplify the power of the second intermediate signal to obtain a third intermediate signal, and to output the third intermediate signal to the emitter; and the emitter is operable to up-convert the received third intermediate signal to a second signal, and to emit the second signal through the transmitting antenna.

17. The wireless video signal transmission system according to claim 9, wherein the receiver comprises a receiving antenna, a second attenuator, a receiver, a second local oscillator, and a second intermediate frequency amplifier;

the receiving antenna is operable to receive the second signal transmitted by the wireless transmitter;

the second attenuator is operable to decrease the power of the second signal received by the receiving antenna to obtain a fourth intermediate signal;

the receiver is operable to demodulate the fourth intermediate signal to obtain a fifth intermediate signal;

the second local oscillator is operable to modulate the frequency of the fifth intermediate signal, so as to obtain a sixth intermediate signal; and the second intermediate frequency amplifier is operable to amplify the sixth intermediate signal modulated by the second local oscillator, so as to obtain the first signal.

18. The display system according to claim 10, wherein the receiver comprises a receiving antenna, a second attenuator, a receiver, a second local oscillator, and a second intermediate frequency amplifier;

the receiving antenna is operable to receive the second signal transmitted by the wireless transmitter;

the second attenuator is operable to decrease the power of the second signal received by the receiving antenna to obtain a fourth intermediate signal;

the receiver is operable to demodulate the fourth intermediate signal to obtain a fifth intermediate signal;

the second local oscillator is operable to modulate the frequency of the fifth intermediate signal, so as to obtain a sixth intermediate signal; and the second intermediate frequency amplifier is operable to amplify the sixth intermediate signal modulated by the second local oscillator, so as to obtain the first signal.

* * * * *